Sept. 16, 1941.   C. F. JAMES   2,255,847
COMBINED CAN OPENER AND POURING DEVICE
Filed March 13, 1940   2 Sheets—Sheet 1
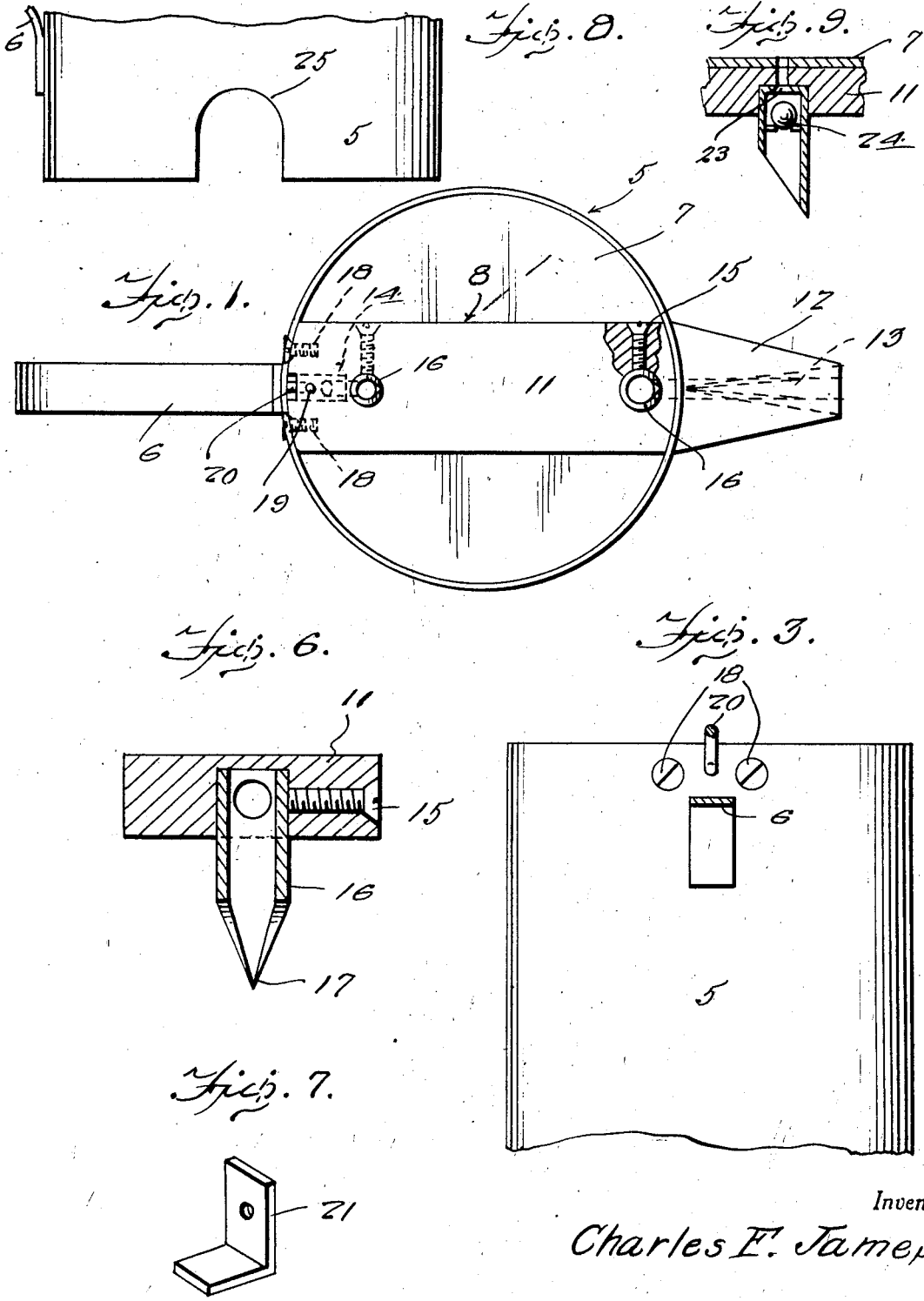
Inventor
Charles F. James
By Clarence A. O'Brien
Attorney Sept. 16, 1941.  C. F. JAMES  2,255,847
COMBINED CAN OPENER AND POURING DEVICE
Filed March 13, 1940   2 Sheets-Sheet 2
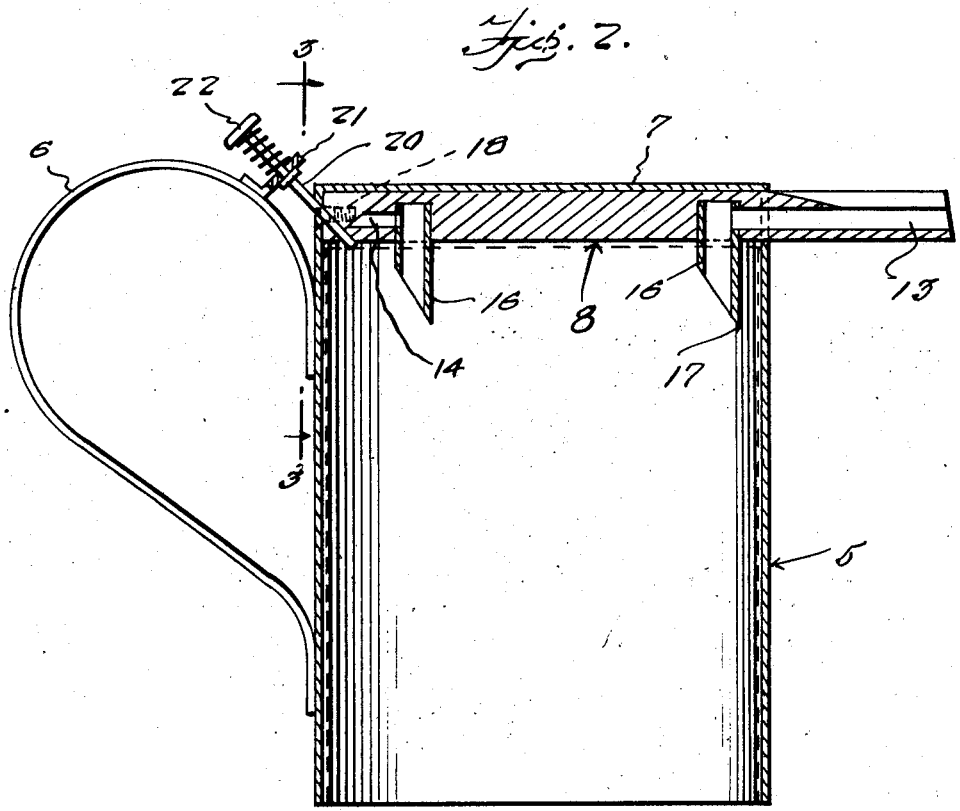
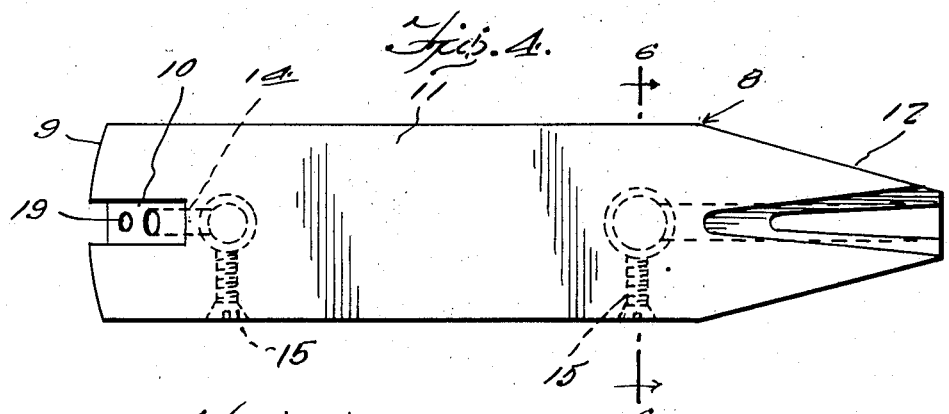
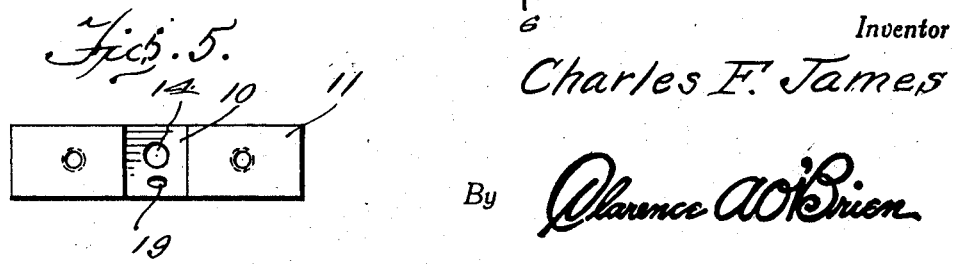

Patented Sept. 16, 1941

2,255,847

UNITED STATES PATENT OFFICE 2,255,847

COMBINED CAN OPENER AND POURING DEVICE

Charles F. James, Elsmere, N. Y.

Application March 13, 1940, Serial No. 323,814

1 Claim. (Cl. 65—61)

This invention relates to a combined can opener and pouring device, and has for the primary object the provision of a device of the above stated character which may be easily and quickly applied to a can for puncturing openings into the latter for the purpose of venting the contents and for dispensing said contents and which will completely hide from view the can and permit pouring of the contents without danger of spilling and also acts to prevent foreign matter from entering the can after once being opened and eliminates spilling of the contents over the exterior of the can and further presents a very pleasing appearance with all advertising matter on the can completely hidden from view and may be easily removed from the can after the complete emptying of the contents.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a bottom plan view, partly in section, illustrating a combined can opener and pouring device constructed in accordance with my invention.

Figure 2 is a vertical sectional view illustrating the device.

Figure 3 is a sectional view taken on the line 3—3 of Figure 2.

Figure 4 is a top plan view of the puncturing and pouring device removed from the shell of the invention.

Figure 5 is an end elevation of the pouring device.

Figure 6 is a sectional view taken on the line 6—6 of Figure 4.

Figure 7 is a perspective view illustrating a plunger supporting bracket.

Figure 8 is a fragmentary side elevation illustrating a modification of the invention.

Figure 9 is a detail sectional view illustrating a modification of the invention.

Referring in detail to the drawings, the numeral 5 indicates a shell of a dimension which will permit the placing thereof over a can. It is to be understood that the shell can be of various shapes to match the shapes of cans now used in the sale of liquids and is provided with a suitable handle 6 to facilitate the application and removal of the shell from a can and for handling of the shell in the act of pouring the contents of the can after being opened by the present invention. The lower end of the shell is fully open while the upper end is closed by a top wall 7.

A combined puncturing device and pouring spout 8 is removably mounted in the shell 5 and lies against the top wall 7 and has one end arcuately curved, as shown at 9, to match the curvature of the wall of the shell and extending into the curved end 9 and opening through the top face of said combined puncturing and pouring device 7 is a groove 10. The combined puncturing and pouring device 7 includes an elongated body 11 tapered at one end, as shown at 12, to form a spout portion which extends through an opening in the wall of the shell and has formed therein a passage 13. The passage 13 opens outwardly through the free end of the body and also a portion of said passage opens through the top face of the body. The inner end of the passage communicates with a socket formed in the body and a like socket is formed in the body adjacent the groove 10. The latter-named socket is in communication with the groove 10 by a passage 14.

Removably mounted in the socket by set screws 15 are penetrating elements 16 both of hollow formation and one having communication with the passage 14 and the other with the pouring passage 13. The penetrating elements are cut on a bias to form penetrating points 17 located a selected distance below the bottom face of the body 11 so that on the application of the shell 5 to a can, and with pressure applied to the top wall, the penetrating elements will be forced through the top of the can venting the interior of the latter and also allowing the contents while vented to be poured from the can by way of the spout or the passage 13 thereof.

As shown in Figure 2, the puncturing elements 16 have the penetrating ends 17 similarly arranged so that when they penetrate a can, they force said can against a wall of the shell and thereby prevent the can from slipping off of the penetrating elements or from the shell.

Screws or like fasteners 18 are employed for removably securing the body 11 in the shell by threading into the curved end 9 of the body. Said end of the body is also provided with a guide opening 19 which opens outwardly in the groove 10 and also through the bottom face of the body 11 to slidably receive a plunger 20. The plunger 20 is further slidably supported in an opening provided in the shell 5 and in a bracket 21 mounted on the handle 6. The free end of the plunger is equipped with a finger piece 22 and interposed between the finger piece and the bracket is an expansible spring acting to retract the plunger. However, with pressure on the finger piece, the plunger may be caused to travel inwardly and contact the top of the can for forcing the latter off of the penetrating elements, it being understood that when the penetrating elements pass through the top wall of the can they have a tendency of forcing the can against the walls of the shell and thereby retain the can in the shell against accidental displacement. Furthermore, it is to be understood that the penetrating elements puncturing openings in the can frictionally fit the walls of the punctured openings so as to prevent foreign matter from entering the can about the puncturing elements and as the latter are not directly open to the atmosphere dirt and other foreign matter will be prevented from entering the can by passing through said puncturing elements.

If desired, the puncturing element which forms the vent opening may be provided with a valve seat 23 and movably mounted within the latter-named vent element is a ball check valve 24, the purpose of which is to close the vent should the liquid contents be of a charged nature and permit said contents from escaping under its pressure but which will admit atmospheric pressure to the interior of the can sufficient to assure proper pouring thereof.

While I have herein described the use of the plunger for the purpose of removing the can from the shell, it is to be understood that the shell adjacent its lower edges may be cut-away to form finger openings 25, as shown in Figure 8, so that a person may readily grip the can within the shell for the purpose of extracting the can therefrom.

Further it is to be understood that the shell 5 and the protruding part of the spout as well as the handle 6 may be so finished as to give or provide an attractive appearance to the device and when applied to a can for the purpose of opening the latter, it will retain the can therein and completely concealed from view.

It is believed that the foregoing description, when taken in connection with the drawings will fully set forth the construction and advantages of this invention to those skilled in the art to which such a device relates, so that further detailed description will not be required.

Having thus described the invention, what I claim is:

In a can opener and pouring device, a cylindrical shell having one end closed by an end wall and provided with an opening adjacent to said wall, an elongated body arranged in the shell against said end wall and having a tapered end portion extending through the opening and provided with a passage opening outwardly through the end of said end portion and the top face of the body, tubular penetrating elements partly embedded in the body and one of said elements communicating with the passage, said body having a rounded end abutting the shell and provided with a groove and a vent passage communicating the groove with the other penetrating element, a spring influenced plunger extending through the shell and body to engage a can punctured by said elements whereby the can may be forced off of said elements and from the shell, a handle on the shell, and a bracket carried by the handle and slidably supporting the plunger.

CHARLES F. JAMES.